United States Patent
Benzing

(10) Patent No.: US 11,760,664 B2
(45) Date of Patent: Sep. 19, 2023

(54) BIOACTIVE FILTER

(71) Applicant: Christian P. Benzing, Stuttgart (DE)

(72) Inventor: Christian P. Benzing, Stuttgart (DE)

(73) Assignee: Christian P. Benzing, Stuttgart (DE)

( * ) Notice: Subject to any disclaimer, the term of this patent is extended or adjusted under 35 U.S.C. 154(b) by 311 days.

(21) Appl. No.: 16/766,517

(22) PCT Filed: Oct. 26, 2018

(86) PCT No.: PCT/EP2018/079388
§ 371 (c)(1),
(2) Date: Jun. 18, 2020

(87) PCT Pub. No.: WO2019/101474
PCT Pub. Date: May 31, 2019

(65) Prior Publication Data
US 2020/0346954 A1    Nov. 5, 2020

(30) Foreign Application Priority Data

Nov. 23, 2017 (DE) .................. 20 2017 107 123.5

(51) Int. Cl.
| | |
|---|---|
| *C02F 1/50* | (2023.01) |
| *B01D 29/00* | (2006.01) |
| *B01D 39/12* | (2006.01) |
| *B01D 39/20* | (2006.01) |
| *C02F 1/00* | (2023.01) |
| *C02F 101/10* | (2006.01) |

(52) U.S. Cl.
CPC .......... *C02F 1/505* (2013.01); *B01D 29/0097* (2013.01); *B01D 39/12* (2013.01); *B01D 39/2031* (2013.01); *C02F 1/001* (2013.01); *B01D 2201/04* (2013.01); *B01D 2201/4038* (2013.01); *B01D 2201/602* (2013.01); *B01D 2239/0407* (2013.01); *B01D 2239/0442* (2013.01); *B01D 2239/0478* (2013.01); *C02F 2101/10* (2013.01); *C02F 2301/024* (2013.01)

(58) Field of Classification Search
None
See application file for complete search history.

(56) References Cited

U.S. PATENT DOCUMENTS

| | | | |
|---|---|---|---|
| 2004/0222145 A1* | 11/2004 | Onoue | ................... B01D 35/30 210/232 |
| 2007/0138071 A1 | 6/2007 | Frogatt | |
| 2010/0143431 A1* | 6/2010 | Landau | ................... C02F 1/505 204/192.15 |

FOREIGN PATENT DOCUMENTS

| | | |
|---|---|---|
| DE | 102015221750 A1 | 5/2017 |
| EP | 3235897 A1 | 10/2017 |
| WO | 0056371 A1 | 9/2000 |
| WO | 2011139835 A2 | 11/2011 |
| WO | 2015103948 A1 | 7/2015 |

* cited by examiner

*Primary Examiner* — Benjamin M Kurtz
(74) *Attorney, Agent, or Firm* — McNees Wallace & Nurick LLC

(57) ABSTRACT

The invention relates to a bioactive filter for the disinfection of liquids, in particular water or aqueous solutions in containers. A structure that is advantageous in terms of filter efficiency is obtained by forming a spherical or oval filter body (1), which is coated with noble metals (FIG. 1).

9 Claims, 2 Drawing Sheets

BIOACTIVE FILTER

The invention relates to a bioactive filter for the disinfection of liquids, in particular water or aqueous solutions in containers.

Known filters and filtering methods for the disinfection of liquids, e.g. water or aqueous solutions, use either antimicrobial disinfection solutions that contain aggressive chemical substances, such as alcohols, phenols, formaldehyde, or strongly oxidizing agents, such as bleaching agents, hypochlorite, or mineral acids. Other filters and filtering methods use silver, the antibacterial efficacy of which is well known. The biocidal action of silver or of silver ions and the concentration thereof in a liquid is based on three essential factors: 1. Silver ions destroy the cellular transport mechanism and the proteolytic activity of bacterial cells by bonding to enzymes and structural proteins of the bacterial cell wall and cell membrane. 2. Silver ions prevent the DNA replication of bacteria by bonding to the DNA. 3. Silver ions block the respiratory chain of bacteria at the cytochromes and interfere with metabolic processes.

The disadvantages of these filters and methods are, for one, that the chemicals and oxidizing agents used have a high corrosive and toxic potential, which causes damage to devices used and the surfaces thereof and poses a risk to humans, since water or aqueous solutions treated in this way are inedible and potentially harmful. For another, filters that are produced using silver are either problematic due to the direct dissolution of the silver in the liquid, or highly complex in terms of the number of substances used or in terms of the production process, and often require a large number of individual filter elements to disinfect a certain volume of liquid. Moreover, classic silver technology entails a number of problems, such as a substantially delayed onset of the antimicrobial effect, a dependence on the release and stabilization of free silver ions, the deactivation of silver ions by sulfur compounds or complexing agents, and a limited spectrum of activity for efficient microbial decontamination.

From publication No. EP 2 077 976 B1, a filter for the decontamination and disinfection of water or aqueous solutions is known, which has a bioactive coating that comprises at least ruthenium or silver-ruthenium bimetallic particles and is applied to a silver or silver-containing surface or is in contact with a silver coating, the coating additionally comprising the vitamin ascorbic acid and at least one surface-active substance. The effect that is required for filtering is achieved by the use of ascorbic acid in addition to the noble metals silver and ruthenium and the surface-active substance. The surface-active substance is a compound from the group of anionic, non-ionic, amphoteric, and cationic surfactants, or a suitable mixture thereof. In practical terms, these filters consist of a large number of individual wire meshes, which are rolled up into a spiral and are located in a liquid-permeable container. DE 10 2014 042 A1 also discloses such a system for water disinfection. US 2007/0138071 A1 discloses filter means formed from a coated mesh material, which are installed in a shower head assembly or a liquid tank for the disinfection of water. Such filter means can also result in limited efficacy, e.g. in the case of dense packing.

A further system for the disinfection of water, namely an assembly for the oligodynamic sterilization and activation of liquids, in particular water, is disclosed in DE 556 137 A.

The object of the present invention is to develop and produce a bioactive filter that overcomes the problems and limitations described above. More specifically, the object of the invention is to provide a filter that works efficiently even when a small number of noble metals or substances are used, and that makes it possible to effectively clean the largest possible volume of liquid.

This object is achieved by the filter having the features of claim 1.

The filter is formed from a spherical or oval (ellipsoidal), in particular hollow, filter body, which is coated with noble metals.

The spherical shape, in particular, provides a large surface area, which advantageously protects the inner surface and also enables good flow. This shape advantageously also causes oxygen molecules to be picked up as the filter is thrown into the water, enabling the sphere or the filter to float on the water for a time. The effective cleaning action is supported by turning and by penetration of the water into the filter. Depending on the amount of liquid, multiple spheres may also be additively combined.

Further enhancements result from the features of the dependent claims.

In one embodiment, which is advantageous in terms of both production and action, the preferably hollow filter body consists of two, in particular hollow, hemispherical filter parts made of stainless steel wire mesh, which are connected to one another by means of a stainless steel ring. Each of the filter parts advantageously comprises, on its open side, an outwardly (radially) projecting collar for the purpose of connection, and the stainless steel ring connects the two collars to one another or fixes them against one another. The collar with the circumferential stainless steel ring produces good flow properties both through and around the filter, and advantageously creates mutual distances between multiple filter bodies.

A second embodiment, which is advantageous in terms of the function and production of the filter, is characterized in that the wire mesh and/or the ring is coated with at least two noble metals.

In a third embodiment, which is advantageous in terms of the function of the filter, at least one of the noble metals is silver and/or ruthenium.

A further embodiment, which is advantageous in terms of the function of the filter, consists in that the noble metals are in moisture contact with the surrounding environment.

In a further embodiment, which is advantageous in terms of the production of the filter, the noble metals are applied either in succession or as bimetallic particles to the wire mesh and/or the ring.

A further embodiment, which is advantageous in terms of the production of the filter, is achieved by applying the noble metals to the wire mesh and/or the ring by means of a mechanical, galvanic, or vacuum technology process.

Another embodiment, which is advantageous in terms of the function of the filter, is characterized in that during use, turbulence is formed within the liquid by the wire mesh and/or the ring, which increases the contact between the bioactive coating of the filter and the molecules of the liquid.

In a further embodiment, which is advantageous in terms of the function of the filter, the filter is configured in such a way that when the liquid is moved through the wire mesh and/or the ring, movement of the filter is intensified.

In a further embodiment, which is advantageous in terms of the function of the filter, the filter body is configured such that particles, such as lime, floating in the liquid are prevented by means of the wire mesh and/or the ring from being deposited onto a wall of the container, and such that the particles are bound into or onto said wire mesh and/or ring.

In a further embodiment, which is advantageous in terms of the production of the filter, the ring is pressed, crimped, stamped, riveted, or welded onto the collar.

In a further embodiment, which is advantageous in terms of the function of the filter, the wire mesh and/or the ring is or are coated with at least one additional reaction-enhancing substance.

The invention will be explained in greater detail below in the context of an exemplary embodiment, with reference to the drawings. In the drawings.

Figure 1:
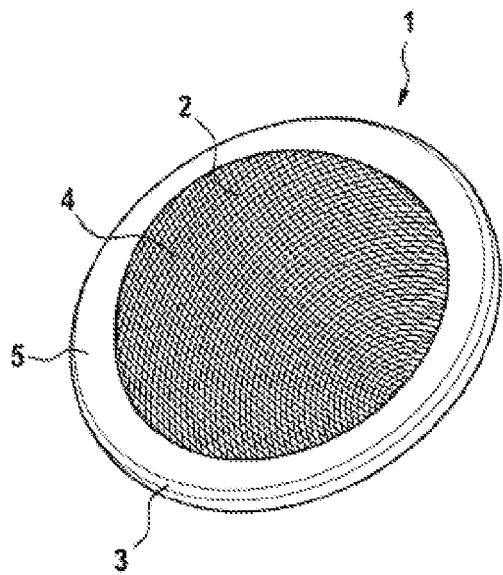
FIG. 1 is a perspective view of a filter body with a hemispherical filter part.

FIG. 1 shows a hemispherical filter part 4 made from a stainless steel wire mesh 2. Filter part 4 has a collar 5 protruding from the open end of the hemisphere. Said filter part is coated either first with silver and then with ruthenium, or with bimetallic particles that consist of both of these noble metals. The coating may be applied using a mechanical, galvanic, or vacuum technology process. The ruthenium applied to the silver layer or the ruthenium bonded to the silver in bimetallic particles acts as a contact catalyst for the formation and dissolution of silver ions from the silver and the conversion to liquids. These silver ions then come into contact with the cells of microbes contained in the liquid and produce a destabilizing effect on the cell membrane. This disrupts cell metabolism and the cell division process. In addition, reactive oxygen species (ROS), also called oxygen free radicals, are formed in situ, i.e. during the reaction process. The ROS formed, like the released silver ions, influence the DNA, the cell membrane, and the membrane proteins. In contrast to the classic application of silver in filters, the strong antimicrobial action is no longer largely dependent on the concentration of silver ions.

Figure 2:
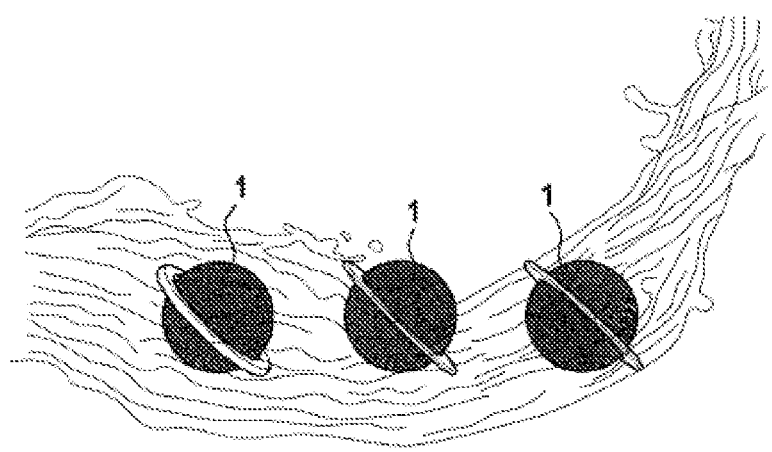
FIG. 2 is a perspective view of a fully assembled filter.

FIG. 2 shows a fully assembled filter. To produce the filter body 1, the two hemispherical, preferably hollow filter parts 4 are placed during assembly with their collars 5 abutting against one another, and the collars 5 are then connected to one another by means of a stainless steel ring 3 by pressing, crimping, stamping, riveting, or welding. Turbulence is induced in the liquid by wire mesh 2 and/or ring 3, by virtue of the natural movement of the liquid, and this turbulence brings a maximum number of silver ions or oxygen free radicals in contact with microbes moving around in the liquid, even when the filter is resting in the liquid. With additional movement of the liquid, e.g. by movement of the liquid container or circulation of the liquid inside the container, movement of the filter is intensified by wire mesh 2 and/or ring 3, resulting in a further increase in the combinations of silver ions/oxygen free radicals and microbes. This passive or active circulation of the liquid greatly increases the sphere of action of the filter as compared with other solutions of the prior art, so that a significantly larger volume of liquid can be disinfected with just one filter. The effort involved in filter production is likewise significantly reduced as a result, and both the amount of materials used and the costs are decreased. As a further effect of wire mesh 2 and/or ring 3, particles, such as lime, floating in the liquid are prevented from being deposited onto a wall of the container, and these particles become bound into or onto said wire mesh or ring. Wire mesh 2 and/or ring 3 can also be coated with at least one additional reaction-enhancing substance, further increasing the reactivity of the active substances released from the filter with the microbes.

Figure 3:
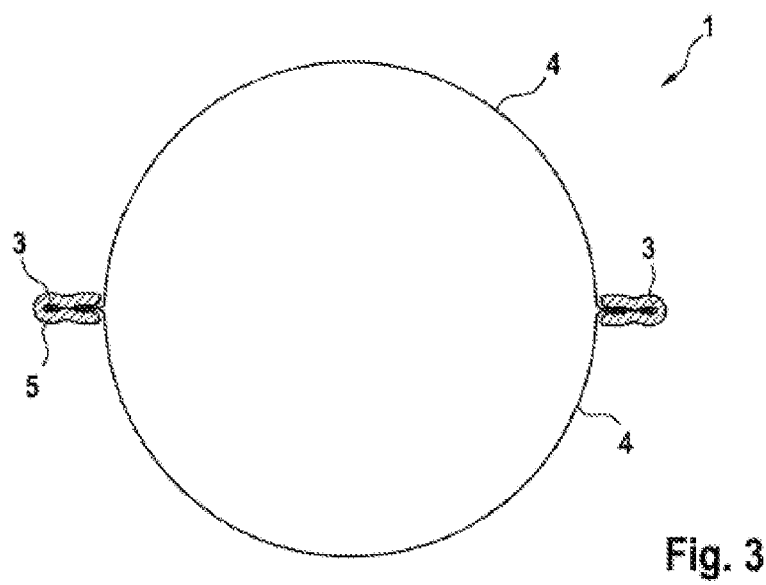
FIG. 3 is a cross section of the fully assembled filter.

FIG. 3 shows the filter in cross section, with filter body 1, the two hemispherical filter parts 4, collar 5, and ring 3 connecting the collars 5, which ring encompasses the two collars 5 and is fixed, e.g. by stamping. The hemispherical filter parts 4, preferably consisting of one layer, but alternatively consisting of multiple layers, can be readily produced, e.g. by molding or deformation, from flat, planar lattice or mesh material.

The filter is intended for use particularly for filtering water, e.g. for tanks in coffee or tea preparing appliances, drinking bottles, carafes, oral irrigators, flower vases, mobile water tanks, e.g. in recreational vehicles, or for permanent installation in water supply lines. Its added advantages lie in its quick and permanent reduction of microbes in the liquid, its ease of use, and its long service life.

The invention claimed is:

1. A bioactive filter for disinfection of liquids, for water or aqueous solutions in containers, comprising:
   a spherical or oval filter body coated with noble metals,
   wherein the filter body includes two hemispherical filter parts made of stainless steel wire mesh, which are connected to one another by a ring made of stainless steel,
   wherein each of the filter parts has, on its open side, an outwardly projecting collar,
   wherein the outwardly projecting collar consists of the wire mesh,
   wherein the ring connects the two collars to one another,
   wherein at least one of the wire mesh or the ring is coated with silver and then with ruthenium or bimetallic particles that consist of silver and ruthenium, and
   wherein the ring is pressed, crimped, stamped, riveted, or welded onto the collars.

2. The filter according to claim 1, wherein the bimetallic particles are composed of at least silver and/or ruthenium.

3. The filter according to claim 1, wherein during use, the noble metals are in moisture contact with a surrounding environment.

4. The filter according to claim 1, wherein the noble metals are applied to the wire mesh and/or the ring by at least one of a mechanical, galvanic, or vacuum technology process.

5. The filter according to claim 1, wherein during use, turbulence is generated within the liquid via the wire mesh and/or the ring.

6. The filter according to claim 1, wherein when the liquid moves through the wire mesh and/or the ring, movement of the filter is intensified.

7. The filter according to claim 1, wherein the filter body is configured such that particles floating in the liquid are prevented by the wire mesh and/or the ring from being deposited onto a wall of the container, and
   wherein the particles are bound by the wire mesh and/or the ring.

8. The filter according to claim 1, wherein the wire mesh and/or the ring is/are coated with at least one additional reaction-enhancing substance.

9. A bioactive filter for disinfection of liquids, for water or aqueous solutions in containers, comprising:
   a spherical or oval filter body coated with noble metals,
   wherein the filter body includes two hemispherical filter parts made of stainless steel wire mesh, which are connected to one another by a ring made of stainless steel,
   wherein each of the filter parts has, on its open side, an outwardly projecting collar,
   wherein the ring connects the two collars to one another and is in contact with the two collars over an entire circumference of each collar, wherein at least one of the wire mesh or the ring is coated with silver and then with ruthenium or bimetallic particles that consist of silver and ruthenium, and wherein the ring is pressed, crimped, stamped, riveted, or welded onto the collars.

\* \* \* \* \*